(12) United States Patent
Nett et al.

(10) Patent No.: US 8,794,886 B1
(45) Date of Patent: Aug. 5, 2014

(54) CARGO TIE DOWN

(71) Applicant: Oshkosh Corporation, Oshkosh, WI (US)

(72) Inventors: Michael J. Nett, Fon Du Lac, WI (US); Justin W. Schrank, Greenville, WI (US); Robert M. Hathaway, Oshkosh, WI (US); James P. Warner, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 13/794,240

(22) Filed: Mar. 11, 2013

(51) Int. Cl.
    *B60P 7/08* (2006.01)
(52) U.S. Cl.
    USPC ............ 410/107; 410/106; 410/109; 410/111
(58) Field of Classification Search
    CPC ...... B60P 3/079; B60P 7/0807; B60P 7/0815; B60P 7/08; B61D 45/001
    USPC ......... 410/106, 107, 109, 110, 111, 112, 113, 410/114; 24/115 K, 265 CD; 248/499
    See application file for complete search history.

(56) References Cited

U.S. PATENT DOCUMENTS

| | | |
|---|---|---|
| 3,628,820 A | 12/1971 | Blatt |
| 3,905,633 A | 9/1975 | Larson |
| 4,074,519 A | 2/1978 | Garrett |
| 4,431,352 A | 2/1984 | Andrews |
| 4,570,987 A | 2/1986 | Wong et al. |
| 4,630,982 A | 12/1986 | Fenner |
| 4,641,986 A | 2/1987 | Tsui et al. |
| 4,699,410 A | 10/1987 | Seidel |
| 4,705,422 A | 11/1987 | Tsui et al. |
| 4,863,205 A | 9/1989 | Schron et al. |
| 5,052,869 A | 10/1991 | Hansen, II |
| 5,248,176 A | 9/1993 | Fredriksson |
| 5,259,711 A | 11/1993 | Beck |
| 5,286,130 A | 2/1994 | Mueller |
| 5,330,300 A | 7/1994 | Jones et al. |
| 5,586,801 A | 12/1996 | Sawyer et al. |
| 5,676,508 A * | 10/1997 | Weicht .......................... 410/101 |
| 5,732,991 A | 3/1998 | Tsui |

(Continued)

FOREIGN PATENT DOCUMENTS

| | | |
|---|---|---|
| DE | 202012101594 | 5/2012 |
| EP | 2182228 | 5/2010 |
| EP | 2361870 | 8/2011 |
| GB | 627834 | 8/1949 |

*Primary Examiner* — Stephen Gordon
(74) *Attorney, Agent, or Firm* — Foley & Lardner LLP

(57) ABSTRACT

A cargo tie down includes a retainer and a shackle. The retainer includes a barrel having a proximal end and a distal end and a flange extending radially outward from the proximal end of the barrel. The shackle includes an arcuate portion merging into a distal end of a first leg and a distal end of a second leg and a necking portion extending between a coupling end and an interface end. A hinge including a pin extends through the shackle and the distal end of the barrel. A proximal end of the first leg and a proximal end of the second leg are separated by a first width. The coupling end spans the first width and joins the proximal end of the first leg to the proximal end of the second leg. The width of the necking portion decreases as it extends from the coupling end to the interface end.

11 Claims, 9 Drawing Sheets

(56) References Cited

U.S. PATENT DOCUMENTS

| | | |
|---|---|---|
| 5,774,948 A | 7/1998 | Petschke et al. |
| 5,775,664 A | 7/1998 | Martin |
| 5,823,588 A | 10/1998 | Morghen |
| 5,848,815 A | 12/1998 | Tsui et al. |
| 5,979,954 A | 11/1999 | Tsui et al. |
| 6,017,071 A | 1/2000 | Morghen |
| 6,022,164 A | 2/2000 | Tsui et al. |
| 6,032,993 A | 3/2000 | Kwon |
| 6,039,500 A | 3/2000 | Kwon |
| 6,142,718 A | 11/2000 | Kroll |
| 6,161,883 A | 12/2000 | Pearl |
| 6,161,884 A | 12/2000 | Pearl |
| 6,199,925 B1 | 3/2001 | Alba |
| 6,213,696 B1 | 4/2001 | Austin |
| 6,241,440 B1 | 6/2001 | Orlebeke |
| 6,267,422 B1 | 7/2001 | Alba |
| 6,293,600 B1 | 9/2001 | Lecourt |
| 6,349,985 B1 | 2/2002 | Aston |
| 6,398,447 B1 | 6/2002 | Pearl |
| 6,443,514 B1 | 9/2002 | Fuller et al. |
| 6,652,012 B1 | 11/2003 | Fuller et al. |
| 6,749,237 B1 | 6/2004 | Ma |
| 7,014,230 B1 | 3/2006 | Hung |

\* cited by examiner

CARGO TIE DOWN

BACKGROUND

The present application relates generally to the field of cargo tie downs. Specifically, the present application relates to a tie down that is moveable to interface with cargo in various positions.

Tie downs (e.g., D-rings, anchors, lugs, eyes, etc.) are configured to restrain cargo or other items to a storage area of a vehicle. A lashing device (e.g., chain, strap, cable, banding, etc.) interfaces with the tie down to secure the cargo. The cargo tie down often operates in a wide variety of environments and scenarios. By way of example, the tie down may experience static stresses of the chain, cable, band, or other device used to lash the cargo or other items to the vehicle. The tie down may also experience dynamic stresses due to sudden changes in velocity of the vehicle (e.g., due to impact with another vehicle or stationary object, a rollover event, etc.).

Traditional tie downs include a D-shaped shackle having parallel legs. The ends of the shackle are coupled to the vehicle with a pinned connection. Where a flat surface is needed in the cargo area (e.g., to support cargo or accessories), the tie downs may be mounted in recessed cups. To mount the tie down, a large hole (e.g., larger than the overall dimensions of the tie down) is cut into the vehicle body. A cup is positioned within the opening and coupled to the vehicle body, and the cup provides a recessed volume into which the tie down is folded thereby providing a flat cargo surface in the storage area. Such an assembly is not particularly compact and may weigh ten pounds or more. When the cargo body includes a large number of such tie downs, a significant weight is added to the vehicle.

SUMMARY

One embodiment relates to a cargo tie down including a retainer and a shackle. The retainer includes a barrel having a proximal end and a distal end and a flange extending radially outward from the proximal end of the barrel. The shackle includes an arcuate portion merging into a distal end of a first leg and a distal end of a second leg and a necking portion extending between a coupling end and an interface end. A hinge including a pin extends through the interface end of the shackle and the distal end of the barrel. A proximal end of the first leg and a proximal end of the second leg are separated by a first width. The coupling end spans the first width and joins the proximal end of the first leg to the proximal end of the second leg. The width of the necking portion decreases as it extends from the coupling end to the interface end.

Another embodiment relates to a cargo body for a vehicle including a deck panel and a cargo tie down coupled to the deck panel. The deck panel defines an aperture and has a support surface and an interface surface. The support surface and the interface surface are disposed on opposing sides of the deck panel. The cargo tie down includes a retainer extending through the aperture, a shackle, a hinge including a pin. The retainer includes a barrel having a proximal end and a distal end and a flange extending radially outward from the proximal end of the barrel and configured to engage the interface surface of the deck panel. The pin extends through the interface end of the shackle and the distal end of the barrel. The shackle includes an arcuate portion and a necking portion. The arcuate portion extends into a first leg and a second leg having proximal ends that are separated by a first width. The necking portion extends between a leg interface that couples the proximal ends of the first leg and second leg and a hinge interface. A width of the necking portion decreases as it extends from the leg interface to the hinge interface.

Still another embodiment relates to a cargo body for a vehicle including a deck panel having a support surface and an underbody surface. The support surface and the underbody surface are disposed on opposing sides of the deck panel. The vehicle further includes a backer plate positioned along the underbody surface of the deck panel; and a cargo tie down coupled to the deck panel and the backer plate. The cargo tie down includes a retainer, a shackle, and a hinge. The retainer includes a barrel having a proximal end and a distal end and a flange extending radially outward from the proximal end of the barrel and configured to engage the interface surface of the deck panel. The hinge includes a pin extending through the interface end of the shackle and the distal end of the barrel. The shackle includes an arcuate portion extending into a first leg and a second leg having proximal ends that are separated by a first width. The shackle further includes a necking portion extending between a leg interface that couples the proximal ends of the first leg and second leg and a hinge interface. A width of the necking portion decreases as it extends from the leg interface to the hinge interface. The deck panel and the backer plate define a pair of corresponding apertures and the retainer extends through the pair of corresponding apertures.

Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Figure 1:
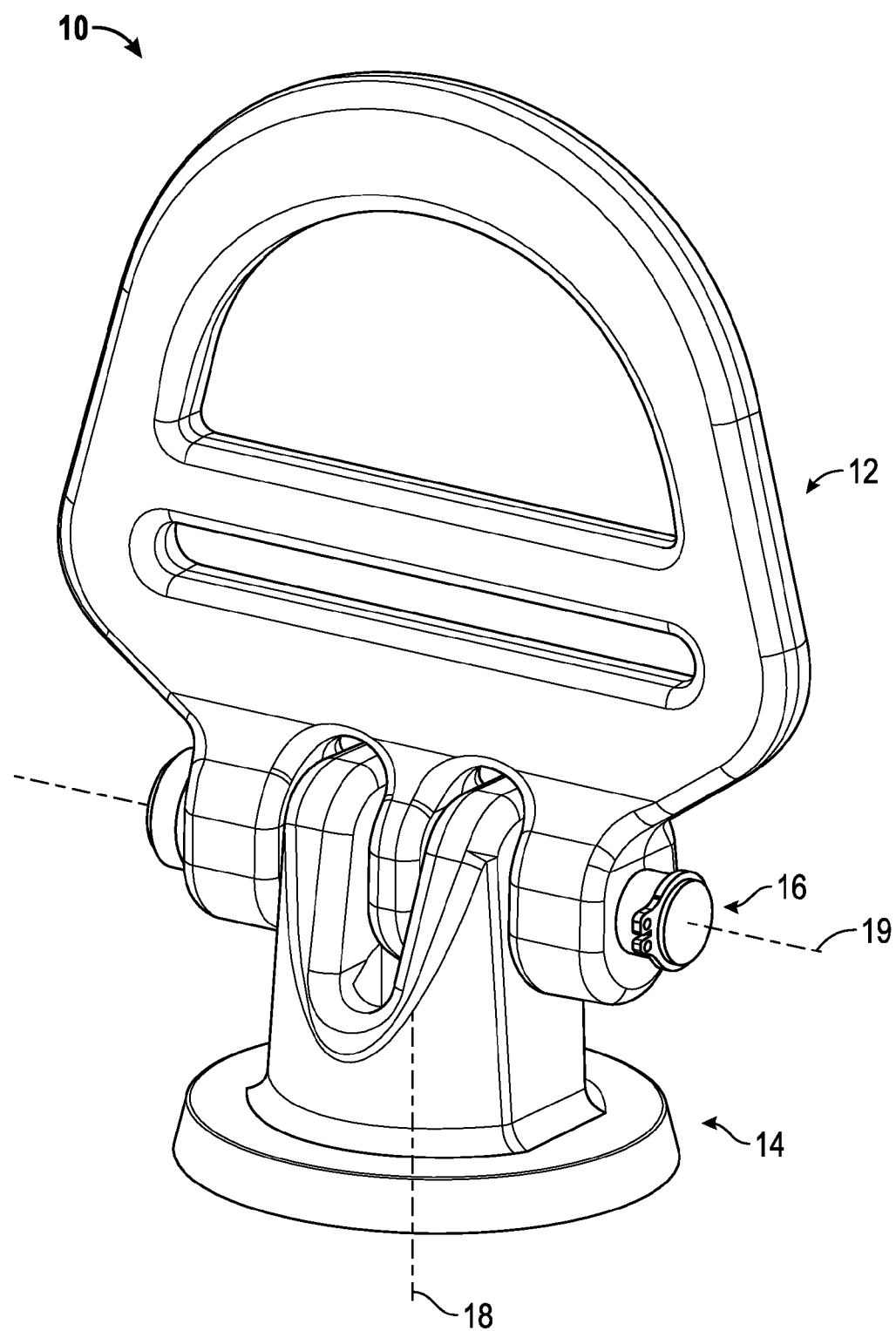
FIG. 1 is an isometric view of a cargo tie down, according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

According to an exemplary embodiment, a cargo tie down, shown as tie down 10, provides a lightweight and low profile alternative to traditional tie downs. The tie down 10 includes a shackle, shown as upper member 12, coupled to a retainer, shown as lower member 14, with a hinge 16. The tie down 10 is configured to be coupled to a structure (e.g., a cargo body, a truck bed, a frame, etc.) and swivel about a first rotational axis 18. According to an exemplary embodiment, the hinge 16 allows the upper member 12 to rotate about a second rotational axis 19 relative to the lower member 14.

The tie down 10 may be coupled to the body of a vehicle and provide an attachment point (e.g., to secure cargo). The vehicle may be a wide variety of tracked or wheeled vehicles including, among others, tanks, tactical vehicles, utility vehicles, cargo vehicles, passenger vehicles, etc. Cargo or other items are coupled to a storage area of the vehicle with a lashing member (e.g., a chain, cable, webbing, band, strap, etc.). At least one end of the lashing member is attached to a tie down, and the lashing member is passed over or through the cargo or other item. The lashing member is then threaded through the tie down or coupled to the tie down with a device, such as a hook. The lashing member is then tightened (e.g., with a ratchet device) to secure the cargo or other items to the vehicle.

Figure 2:
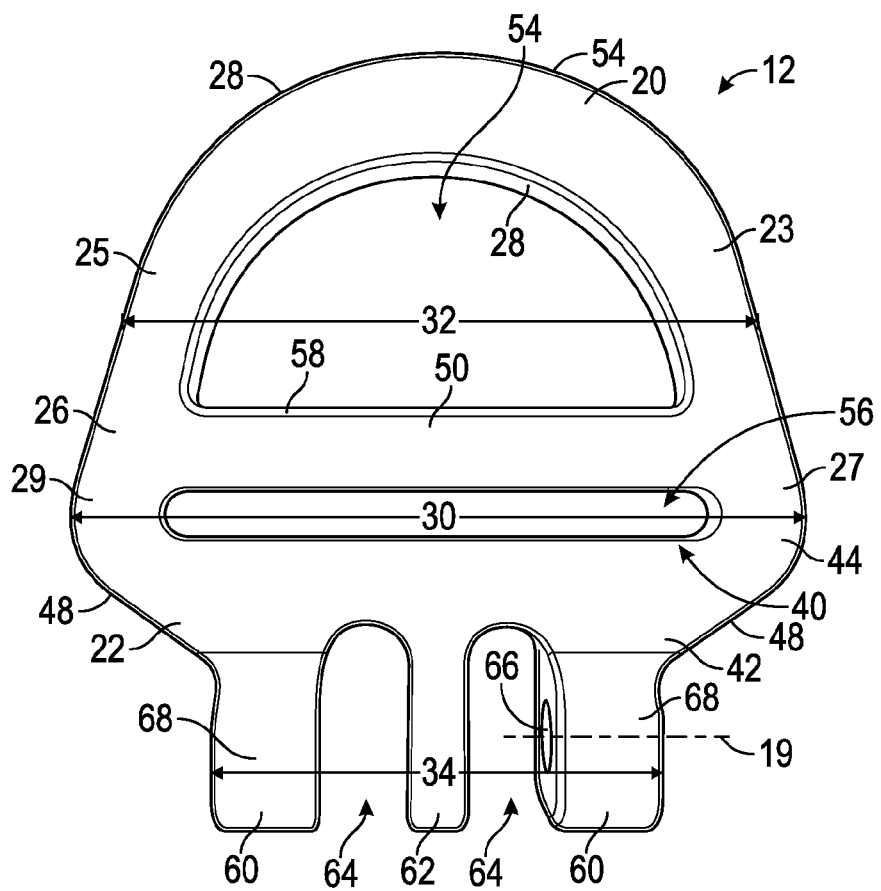
FIG. 2 is a front view of a shackle for a cargo tie down, according to an exemplary embodiment.

Referring next to the exemplary embodiment shown in FIG. 2, the upper member 12 of the tie down 10 includes an arcuate portion, shown as curved portion 20, and a necking portion, shown as reducing portion 22, that provides a structure for coupling the upper member 12 to the lower member 14. The upper member 12 is coupled to the lower member 14 with hinge 16, according to an exemplary embodiment. As shown in FIG. 2, upper member 12 includes a leg 24 and a leg 26 extending between the curved portion 20 and the reducing portion 22.

According to an exemplary embodiment, the curved portion 20 merges into a distal end 23 (e.g., relative to lower member 14) of the leg 24 and a distal end 25 (e.g., relative to lower member 14) of the leg 26. As shown in FIG. 2, curved portion 20, leg 24, and leg 26 form a generally D-shaped or arched contour. According to an exemplary embodiment, the curved portion 20, leg 24 and leg 26 have a rectangular cross-sectional shape with a thickness of less than 0.75 inches. According to an alternative embodiment, the curved portion 20, leg 24, and leg 26 have another cross-sectional shape (e.g., elliptical, round, etc.). As shown in FIG. 2, the curved portion 20 has a width that is greater than the widths of leg 24 and leg 26. In other embodiments, leg 24 and leg 26 may have a width equal to the width of the curved portion 20 or greater than the width of the curved portion 20. According to an exemplary embodiment, the width of the curved portion 20, leg 24, and leg 26 is less than one inch to facilitate coupling a device (e.g., a hook) to the tie down 10. The edges 28 of the curved portion 20, leg 24, and leg 26 are rounded to reduce wear that may otherwise occur to devices engaging the upper member 12. Rounded edges 28 also reduce the risk of injury to an operator handling the upper member 12. According to an alternative embodiment, the edges 28 are chamfered or otherwise shaped.

The proximal end 27 (e.g., relative to lower member 14) of leg 24 and the proximal end 29 (e.g., relative to lower member 14) of leg 26 are separated by a first width 30. According to an exemplary embodiment, leg 24 and leg 26 are angled relative to each other (e.g., inclined, tilted, not parallel, etc.) such that distal end 23 and distal end 25 are separated by a second width 32 that is less than or equal to the first width 30. According to an exemplary embodiment, the angle between leg 24 and leg 26 is between 20 and 40 degrees. In some embodiments, the angle between leg 24 and leg 26 is about 28 degrees (e.g., within a range of 25-31 degrees). In other embodiments, the angle between leg 24 and leg 26 is about 35 degrees (e.g., within a range of 32-38 degrees). The difference between the first width 30 and the second width 32 and the resulting angle between leg 24 and leg 26 may be increased or decreased. By way of example, the second width 32 may be equal to the first width 30 such that the leg 24 is parallel to the leg 26.

The proximal end 27 of the leg 24 and the proximal end 29 of the leg 26 are coupled to the reducing portion 22. The reducing portion 22 extends between a first end 40 (e.g., coupling end) and a second end 42 (e.g., coupling end). The first end 40 merges into the proximal end 27 of leg 24 and the proximal end 29 of leg 26 on either side along a smooth transition radius 44. The first end 40 has a width equal to the first width 30 and extends between leg 24 and leg 26. The width of the reducing portion 22 decreases from the first width 30 at the first end 40 to a third width 34 at the second end 42.

According to an exemplary embodiment, the reducing portion 22 has a rectangular cross-sectional shape with a thickness of less than 0.75 inches. The reducing portion 22 may have a thickness equal to the thickness of the curved portion 20, leg 24, and leg 26 such that the curved portion 20, leg 24, leg 26, and the reducing portion 22 form a substantially planar member. Such a planar member reduces the profile of the tie down. The edges 48 of the reducing portion 22 are rounded to reduce wear that may otherwise occur to devices engaging the reducing portion 22. Rounded edges 48 also reduce the risk of injury to an operator handling the reducing portion 22. According to an alternative embodiment, the edges 48 may be chamfered or otherwise shaped.

The upper member 12 further includes a transverse leg, shown as transverse leg 50 (e.g., bar, link, rib, bar, divider, etc.), extending from the leg 24 and the leg 26 between the curved portion 20 and the reducing portion 22. The transverse leg 50 may have a thickness that is less than one inch. According to an exemplary embodiment, the transverse leg 50 has a thickness equal to the thickness of the curved portion 20, the reducing portion 22, leg 24, and leg 26. In other embodiments, the transverse leg 50 has a thickness that is greater or smaller than the thickness of at least one of the curved portion 20, the reducing portion 22, leg 24, and leg 26. The edges 58 of the transverse leg 50 are rounded to reduce wear to devices engaging the transverse leg 50 (e.g., a strap, etc.). Rounded edges 58 also reduce the risk of injury to an operator handling the tie down 10. According to an alternative embodiment, the edges 58 may be chamfered or otherwise shaped.

As shown in FIG. 2, the transverse leg 50 is offset from the reducing portion 22 thereby separating the aperture defined by the curved portion 20, the reducing portion 22, leg 24, and leg 26 into a first opening 54 proximate the curved portion 20 and a banding slot, shown as a second opening 56, proximate the reducing portion 22. The first opening 54 is a semicircularly shaped aperture configured to receive a device (e.g., a hook) engaging the curved portion 20. According to an exemplary embodiment, the first opening 54 is sized such that a device, such as a hook, with a cross-sectional diameter of up to one inch may be received in the first opening 54. As shown in FIG. 2, the second opening 56 is a narrow, elongated aperture. The width of second opening 56 is defined by the first width 30, the width of leg 24, and the width of leg 26. According to an exemplary embodiment, the second opening 56 is configured to receive webbing (e.g., nylon webbing) or banding (e.g., steel banding) with a width of two inches and a thickness of 0.065 inches. It should be understood that the top edge of second opening 56 may or may not have a full radius.

According to an exemplary embodiment, the upper member 12 further includes projections extending from the second end 42 of the reducing portion 22. The projections form a portion of the hinge 16 that couples the upper member 12 to the lower member 14. As shown in FIG. 2, the upper member 12 includes a pair of outer projections (i.e. extensions, arms, etc.), shown as bosses 60, and an inner projection, shown as boss 62, separated from the bosses 60 by slots 64. Apertures 66 are formed in the bosses 60 and boss 62. The second rotational axis 19 extends through the centers of the apertures 66. According to an exemplary embodiment, bosses 60 and boss 62 have a thickness greater than the thickness of the curved portion 20, reducing portion 22, leg 24, and leg 26 such that the diameter of the apertures 66 is larger than the thickness of the curved portion 20, reducing portion 22, leg 24, and leg 26. According to an exemplary embodiment, the apertures 66 have a diameter of approximately 0.3125 inches (e.g., between 0.25 and 0.5 inches). The sides 68 of the bosses 60 and boss 62 are flattened to improve strength and reduce the mass of the upper member 12. According to an exemplary embodiment, flattened sides 68 are oriented upward when the upper member 12 is folded down onto the surface of the cargo bed, thereby reducing the profile of the tie down. As shown in FIG. 2, slots 64 extend beyond the bosses 60 and boss 62 into the reducing portion 22. The slots 64 provide a clearance for portions of the lower member 14, thereby allowing the upper member 12 to be folded flat against the cargo bed (e.g., normal to the first rotational axis 18).

Figure 3:
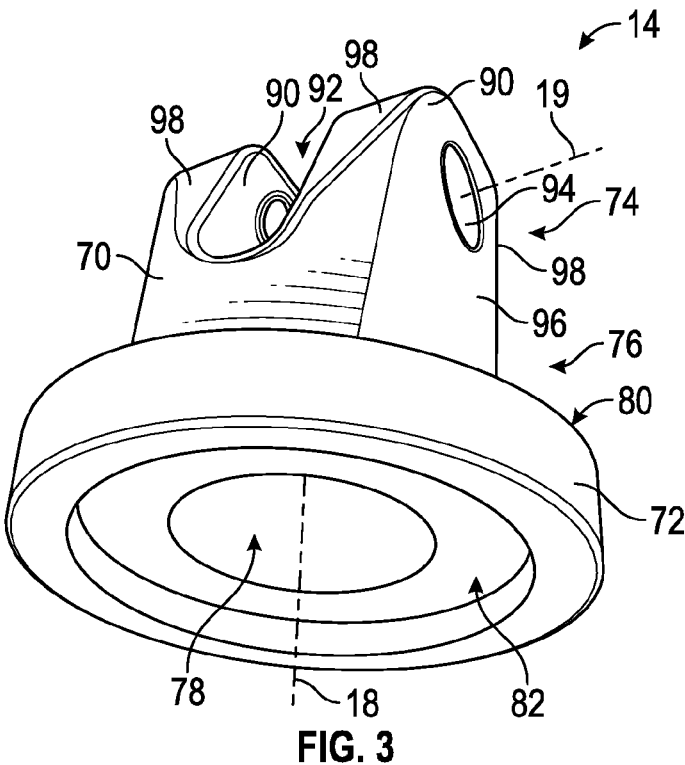
FIG. 3 is a bottom elevation view of the retainer for a cargo tie down, according to an exemplary embodiment.

Referring next to the exemplary embodiment shown in FIG. 3, the lower member 14 of the tie down 10 includes a barrel, shown as body 70, and a flange, shown as protrusion 72. The body 70 may be a generally cylindrical member, a conical member (e.g., having draft angles to facilitate casting, etc.), or may have still another shape. As shown in FIG. 3, body 70 includes a distal end 74 (e.g., relative to a cargo body surface) configured to be coupled to the upper member and a proximal end 76 (e.g., relative to a cargo body surface) configured to engage a surface (e.g., a cargo body). As shown in FIG. 3, the body 70 is hollow and includes a central opening 78. The protrusion 72 projects or extends outward radially from proximal end 76 of the body 70. The body 70 may be received in an opening (e.g., an opening in a cargo bed) and subsequently coupled to the upper member 12. According to an exemplary embodiment, the diameter of the body 70 is smaller than the diameter of the opening into which the lower member 14 is received, allowing the tie down 10 to rotate freely in the opening.

According to an exemplary embodiment, the protrusion 72 limits the travel of the tie down 10 along the first rotational axis 18 through the contact between the structure around the opening and an upper surface 80 (e.g., top surface, contact surface, interface surface) of the protrusion 72. The protrusion 72 may include a recess 82 in the lower surface. The central opening 78 of the body 70 opens into the recess 82. According to an exemplary embodiment, the central opening 78 and the recess 82 reduce the mass of the lower member 14 and the overall weight of the tie down 10.

As shown in FIG. 3, the distal end 74 of the body 70 includes a pair of blades, shown as arms 90, separated by a slot 92. The arms 90 define apertures 94, and the second rotational axis 19 extends through the centers of the apertures 94. The arms 90 and the slot 92 are sized such that the distal end 74 of the body 70 may interlock with the upper member 12. According to an exemplary embodiment, the arms 90 are received into the slots 64 and the boss 62 is received into the slot 92. As shown in FIG. 3, the body 70 has flattened sides 96 to accommodate the bosses 60 of the upper member 12. The apertures 94 in the arms 90 are aligned with the apertures 66 in the bosses 60 and boss 62 (e.g., to receive a pivot shaft). The arms 90 include angled portions 98 that provide relief for portions of the upper member 12 (e.g., as upper member 12 rotates about second rotational axis 19). The angled portions 98 cooperate with the extended slots 64 to allow the upper member 12 to be folded flat against the cargo bed (e.g., normal to the first rotational axis 18).

Figure 4:
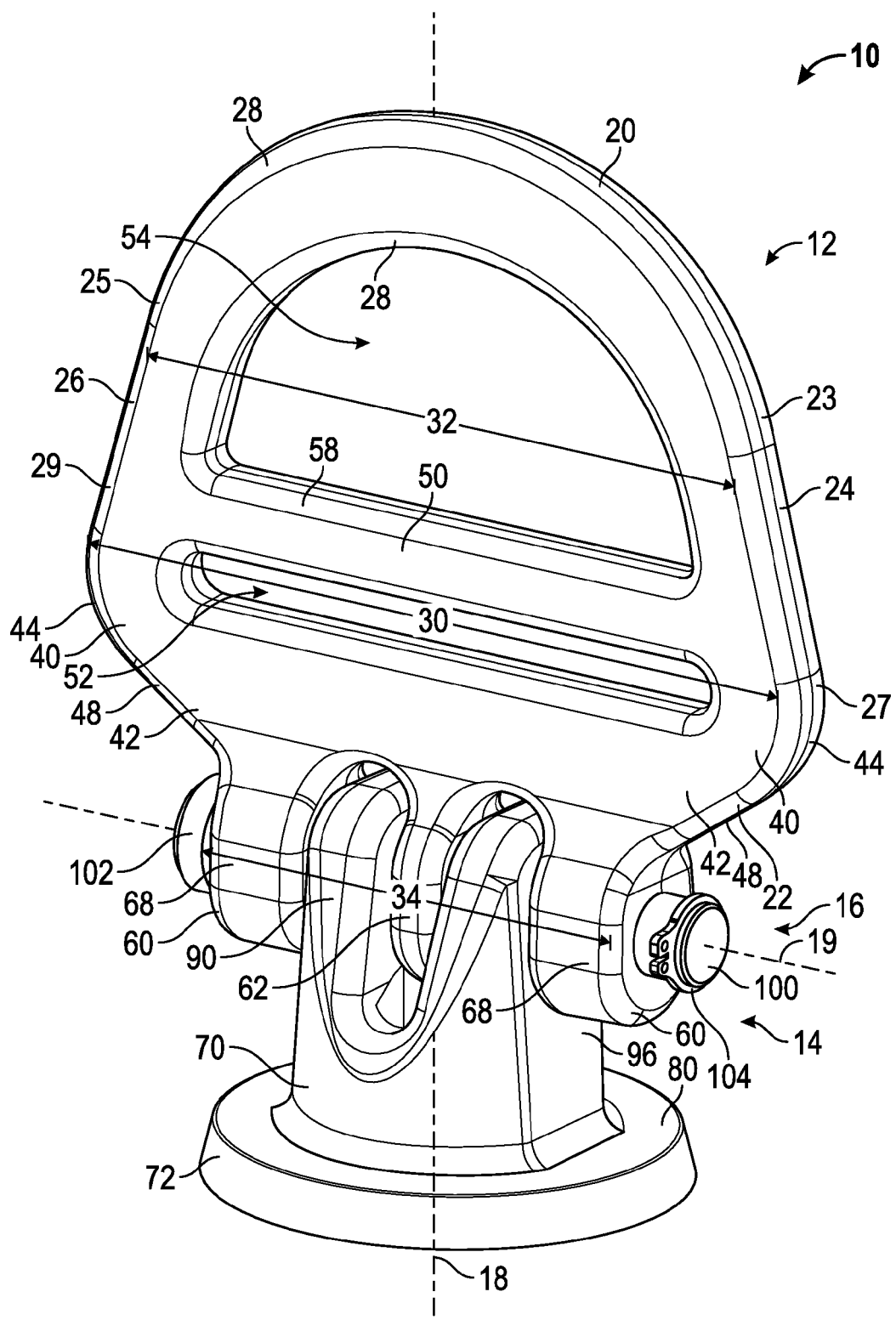
FIG. 4 is an isometric view of a cargo tie down, according to an exemplary embodiment.

Referring next to the exemplary embodiment shown in FIG. 4, the hinge 16 is formed by a pin, shown as pivot shaft 100, inserted into the apertures 66 and the apertures 94. The pivot shaft 100 couples the upper member 12 to the lower member 14 such that upper member 12 may rotate relative to the lower member 14 about the pivot shaft 100 and the second rotational axis 19. The pivot shaft 100 is fixed along the second rotational axis 19 by a head 102 and a removable retaining member, shown as a snap ring 104. The pivot shaft 100 is sized to extend between the outer faces of the bosses 60 of the upper member 12. As shown in FIG. 4, the distance between the bosses 60 is equal to the third width 34 of the reducing portion 22. By reducing the width of the reducing portion 22 between the first width 30 and the third width 34, the tie down 10 reduces the length of the pivot shaft 100 compared to a pin for a traditional, straight-sided D-ring. According to an exemplary embodiment, hinge 16 distributes the shear stresses applied on a pivot shaft 100 due to a load imparted on upper member 12, and pivot shaft 100 has a smaller diameter relative to traditional tie downs. As shown in FIG. 4, pivot shaft 100 is placed in triple shear. By distributing the sheer stress over a greater number of locations, the tie down 10 reduces the maximum shear stress experienced by any location of the pivot shaft 100. According to an exemplary embodiment, the pin diameter is larger and the shear stress may be applied at two points (e.g., the upper member 12 having two projections and the lower member 14 having a single arm). According to still other alternative embodiments, the shear stresses are applied at an even greater number of locations whereby the upper member 12 includes more than three projections and the lower member 14 includes more than two arms.

According to an exemplary embodiment, the tie down 10 is utilized on a military vehicle. The tie down 10 is configured to restrain cargo or other items to the vehicle and is intended to restrain the cargo or other items in a wide variety of operating environments. By way of example, the tie down 10 may be used to restrain cargo accessories to a vehicle (e.g., boat, aircraft, ground vehicles, etc.) travelling over rough terrain. The tie down 10 withstands the static stresses of the chain, cable, band, or other device used to lash the cargo or accessories to the vehicle. The tie down 10 is further withstands dynamic stresses applied to the tie down 10 by the lashing device (e.g., during impact with another vehicle or stationary object, a rollover event, etc.).

Figure 5:
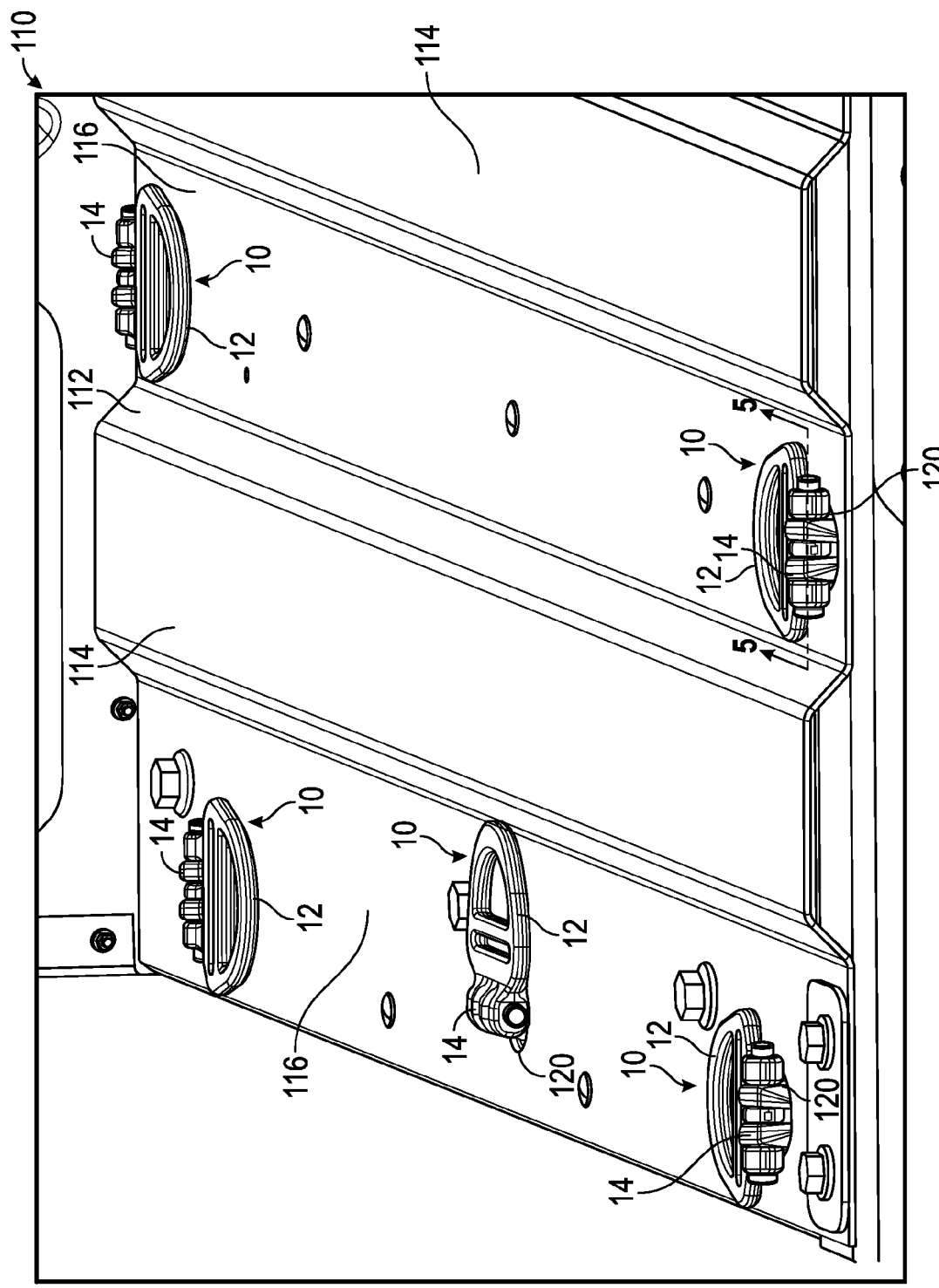
FIG. 5 is an isometric view of a cargo tie down installed in a cargo bed, according to an exemplary embodiment.

Referring next to the exemplary embodiment FIG. 5, a cargo body, shown as cargo bed 110, includes a plurality of tie downs 10. The cargo bed 110 includes a deck panel, shown as floor 112, that is coupled to the vehicle frame. The floor 112 is configured to support accessories or cargo positioned in the cargo bed 110 and secured with the tie downs 10. As shown as FIG. 5, the floor 112 is a corrugated panel including a multitude of protrusions, shown as ridges 114, separated by recesses, shown as depressions 116. While the floor 112 is shown as having parallel ridges 114, the ridges 114 may not be parallel and may intersect each other, according to an alternative embodiment. As shown in FIG. 5, tie downs 10 are received in apertures 120 formed in the depressions 116. In other embodiments, the floor 112 may be a flat deck and the tie downs 10 may be pocket mounted in discrete recessed cups or hollows. In still other embodiments, the cargo is positioned on elevated bosses extending from a flat deck and the tie down 10 is positioned on the flat deck. The number of apertures 120 and tie downs 10 may vary depending on the size of the cargo bed 110. The apertures 120 are located around the perimeter of the cargo bed 110, as shown in FIG. 5. According to an alternative embodiment, apertures 120 are located in the interior portions of the floor 112 or positioned in vertical walls of the cargo bed 110.

Figure 6:
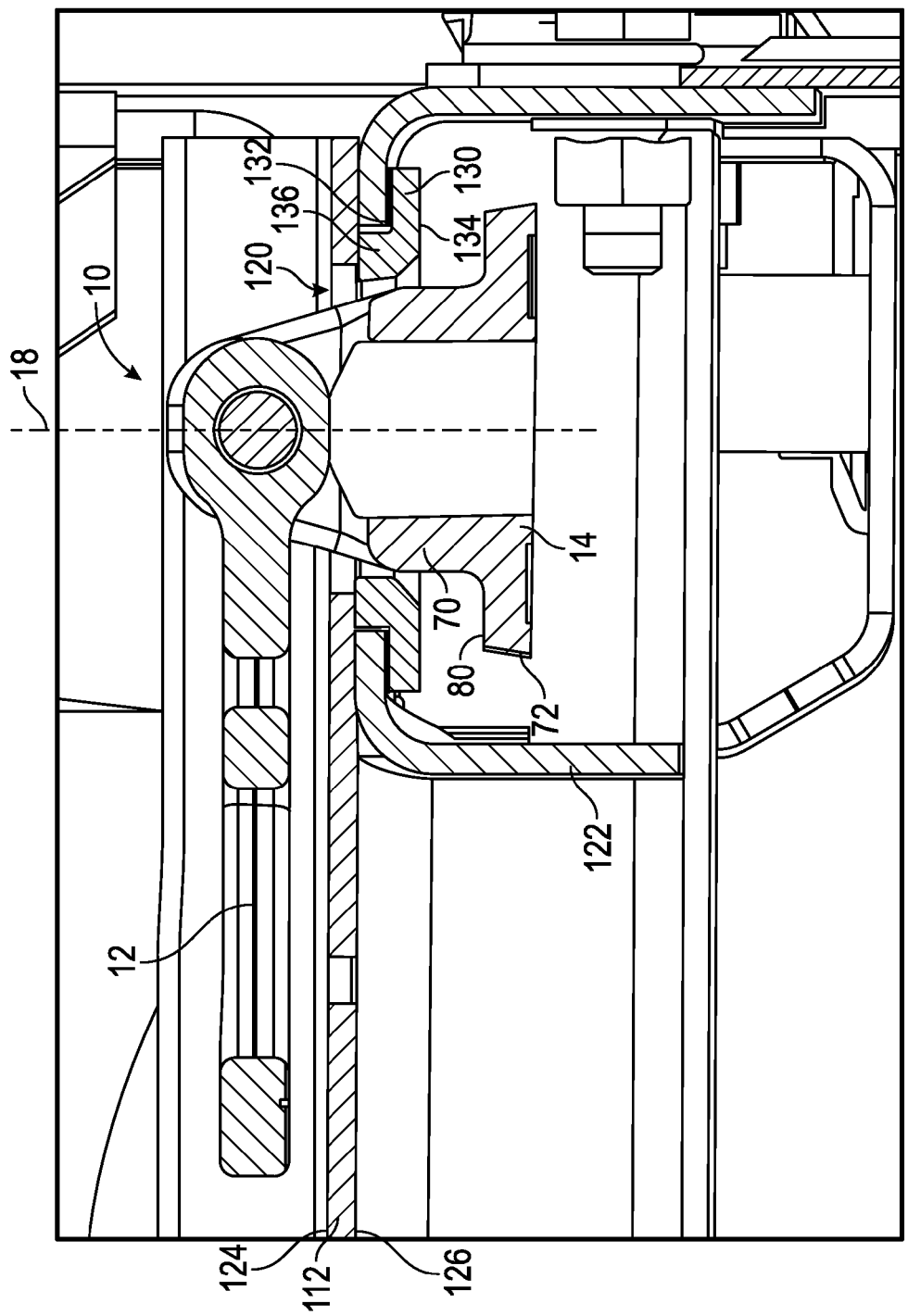
FIG. 6 is a sectional view of a cargo bed and a cargo tie down, according to an exemplary embodiment.

Referring next to the exemplary embodiment shown in FIG. 6, the floor 112 includes a support surface 124 (e.g., top surface, upper surface, outer surface, etc.) and an interface surface 126 (e.g., bottom surface, lower surface, inner surface, etc.) positioned on opposing sides of the floor 112. The tie down 10 is disposed in the aperture 120 with the lower member 14 extending through the aperture 120. The upper member 12 is coupled to the body 70 of the lower member with the hinge 16. According to an exemplary embodiment, the apertures 120 may be aligned with and extend through frame members 122 disposed below the floor 112. The aperture 120 may have a constant size through both the floor 112 and the frame member 122 or include apertures of different sizes in the floor 112 and the frame member 122. According to an exemplary embodiment, the design and coupling of the tie down 10 to the floor 112 via the aperture 120 reduces the likelihood that debris (e.g., leaves, sticks, sand, trash, casings, etc.) will become trapped in the vicinity of the tie down 10. According to an exemplary embodiment, debris in the cargo bed 110 either collects on the support surface 124, where it can be swept away, or falls through the aperture 120 to the underside of the vehicle.

The tie down 10 is configured to have a wide range of motion relative to the floor 112 such that it may be moved into a variety of orientations to accommodate cargo and other items of different sizes and shapes. As shown in FIG. 6, the body 70 has a diameter that is less than the diameter of the aperture 120, allowing the tie down 10 to rotate 360 degrees within the aperture 120 about the first rotational axis 18. The tie down 10 can translate a limited distance along the first rotational axis 18, allowing the upper member 12 to be raised or lowered relative to the floor 112. According to an exemplary embodiment, the tie down 10 is pulled upward until the upper surface 80 of the protrusion 72 directly engages the interface surface 126, when the upper member 12 is engaged by a device (e.g., chain strap, etc.). The tie down 10 is then supported by an annular portion of the floor 112 surrounding the aperture 120.

According to an exemplary embodiment, tie down 10 includes a low profile, facilitated by small thickness of the upper member 12 and the freedom of movement along the first rotational axis 18. When not engaged, the tie down 10 can slide down within the aperture 120 until it is supported by support surface 124. The upper member 12 folds down about the second rotational axis 19 until it is generally horizontal and resting on support surface 124. The upper member 12 may rotate at least 180 degrees about the second rotational axis 19 and rest on either of the two sides. When lying flat on the support surface 124, a tie down 10 is disposed in a depression 116 of the floor 112 remains below the height of the ridges 114 and therefore does not interfere with the placement of cargo or other items placed in the cargo bed 110. According to an alternative embodiment, the tie down 10 is mounted on a vertical wall, and the upper member may rotate 180 degrees about second rotational axis 19 and swivel 360 degrees about first rotational axis 18.

Figure 7:
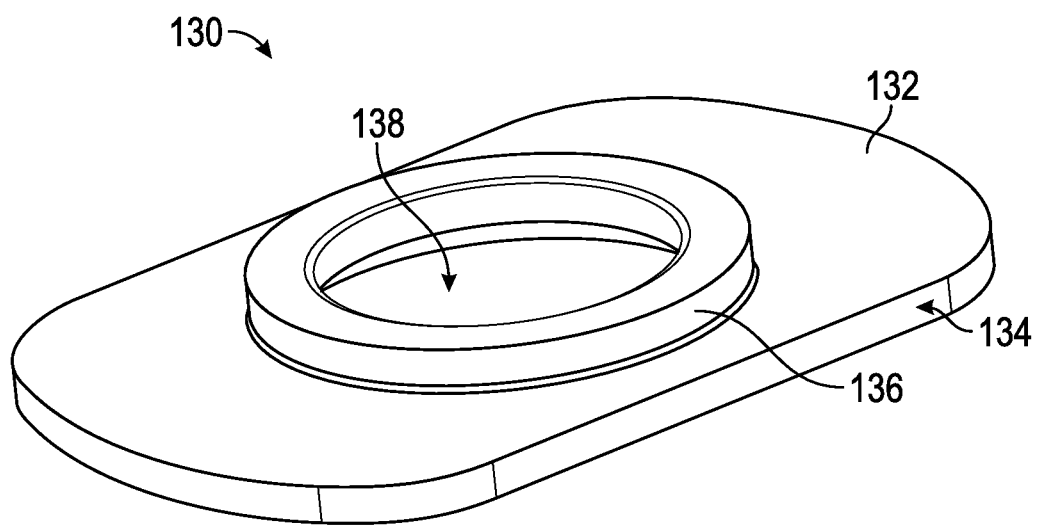
FIG. 7 is an elevation view of a backer plate for a cargo tie down, according to an exemplary embodiment.

As shown in FIGS. 6 and 7, a backer plate 130 is provided between the interface surface 126 and the protrusion 72. The backer plate 130 reinforces the aperture 120 and distributes the stress from a loaded tie down 10 to a larger portion of the interface surface 126. The backer plate 130 includes an upper surface 132, a lower surface 134, and a lip 136 extending from the upper surface 132. The lip 136 defines an aperture 138 extending through the backer plate 130. The backer plate 130 may be coupled to the underside of the floor 112 directly to the interface surface 126 or to a frame member 122, as shown in FIG. 6. According to an exemplary embodiment, the lip 136 is received in the aperture 120. The aperture 138 has a diameter larger than the diameter of the body 70 of the lower member 14, allowing the tie down 10 to rotate and translate freely about the first rotational axis 18. When engaged and loaded, the tie down 10 is pulled upward until the upper surface 80 of the protrusion 72 contacts the lower surface 134 of the backer plate 130. The backer plate 130 transfers the stress to the floor 112 or to a frame member 122.

Figure 8:
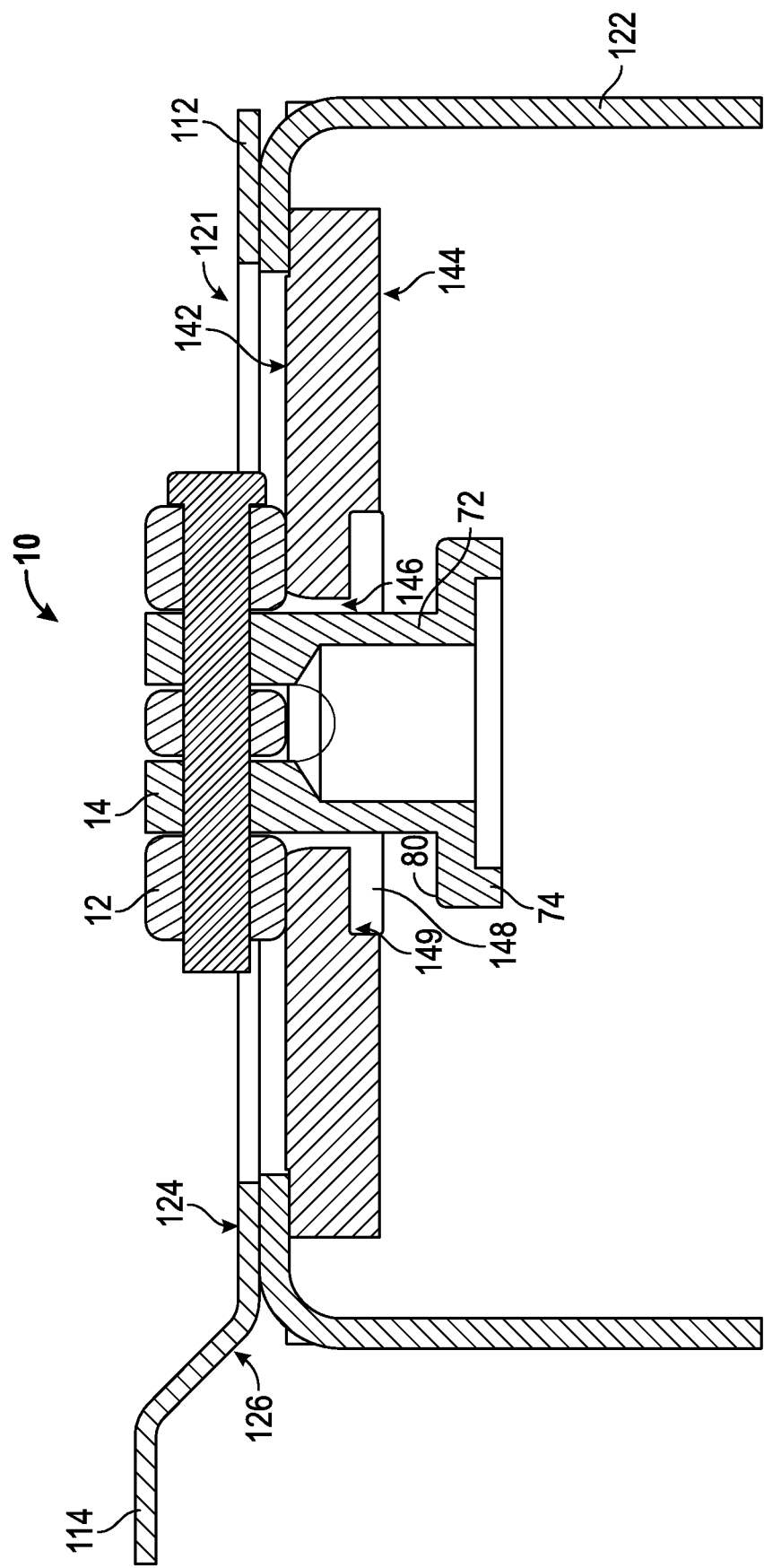
FIG. 8 is a sectional view of a cargo tie down coupled to a cargo bed with an adapter plate, according to an exemplary embodiment.

Referring next to the exemplary embodiment shown in FIG. 8, the floor 112 may include larger apertures 121 (e.g., preexisting openings for traditional pocket-mounted D-rings). Apertures 121 are larger than the protrusion 72 of the lower member 14, and an adapter plate 140 is positioned between protrusion 72 and floor 112. The adapter plate 140 is configured to be coupled to the floor 112 about the periphery of the aperture 121 either directly to the interface surface 126 or to an intermediate member, such as a frame member 122. The adapter plate 140 includes an upper surface 142, a lower surface 144, and an aperture 146 configured to receive the body 70 of the lower member 14. When not engaged, the tie down 10 can slide down within the aperture 146 until it is supported by the upper surface 142 of the adapter plate 140 or the support surface 124 of the floor 112. When engaged by a device, such as a chain or banding, to lash cargo to the cargo bed 110, the tie down 10 is pulled upward until the upper surface 80 of the protrusion 72 engages the lower surface 144 of the adapter plate 140. The adapter plate 140 further includes a recess 148 in the lower surface 144 that is sized to receive the protrusion 72. According to an exemplary embodiment, the recess 148 is sized such that the distance from the recessed surface 149 to the top of the ridges 114 is less than the distance between the upper surface 80 of the protrusion 72 and a downward facing face of the upper member 12 when folded into a storage position. The upper member 12 may secure cargo when positioned against ridges 114 (e.g., when the tie down is pulled upward such that the upper surface 80 of the protrusion 72 contacts the recessed surface 149).

According to an exemplary embodiment, the tie down 10 is formed with a forging process. According to an alternative embodiment, the tie down 10 is otherwise formed (e.g., machined, cast, etc.). The applicants have determined through testing that one embodiment of tie down 10 has a load-carrying capacity (e.g., working load limit, design load, etc.) of 5,000 pounds. No plastic deformation occurred under this load, and no catastrophic failure (e.g., cracking, fracturing, etc.) occurred at a load of 7,500 lbs. The tie down was tested in various positions, including a vertical position and at 75 degrees to either side of vertical (i.e. 15 degrees from horizontal).

According to an exemplary embodiment, the tie down 10 is a small, lightweight provision that is suitable for use in even lightweight vehicles, where space and weight are premium. The reducing portion 22 between the first width 30 and the third width 34 reduces the length of pivot shaft 100 relative to a pin for a traditional, straight-sided D-ring. A shorter pivot shaft 100, in turn, allows for a smaller diameter body 70 and protrusion 72. The tie down 10 is significantly smaller and more lightweight than previous D-ring and other tie down designs. According to an exemplary embodiment, the deck assembly includes structural members having dimensions that are reduced relative to the structural members of traditional deck assemblies. The dimension of the structural members for the deck assembly are reduced and correspond to the reduced size of tie down 10. Such structural members reduce the weight of the deck assembly (i.e. smaller tie downs require smaller structural members to mount within thereby lowering the weight of the deck assembly). The bed assembly may also include tie downs spaced closer to the edge of the load surface thereby increasing the defined cargo footprint of the bed assembly. According to an exemplary embodiment, the tie down 10 weighs approximately 0.7 pounds, which is less than traditional tie downs of the same class. The weight reduction of the tie down 10 results in a significant weight reduction for a vehicle with the cargo bed 110, which may include several tie downs 10. In addition, the tie down has a low profile, which in combination with its position within depression 116, allows the tie down 10 to be folded down unobtrusively in the cargo bed 110 such that it does not interfere with the placement of cargo or other items on the ridges 114.

Figure 9:
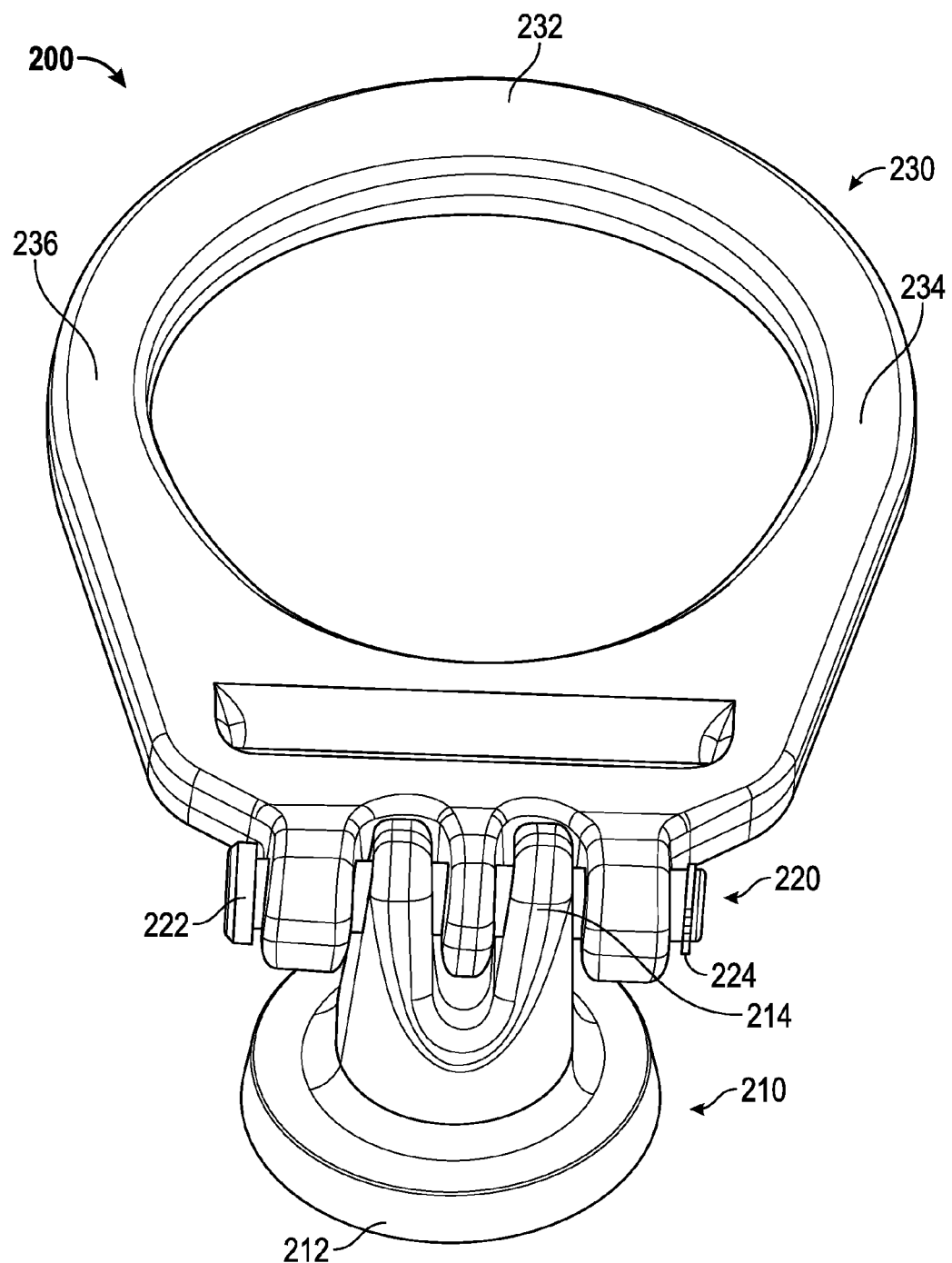
FIG. 9 is an elevation view of a cargo tie down, according to an alternative embodiment.
Figure 10:
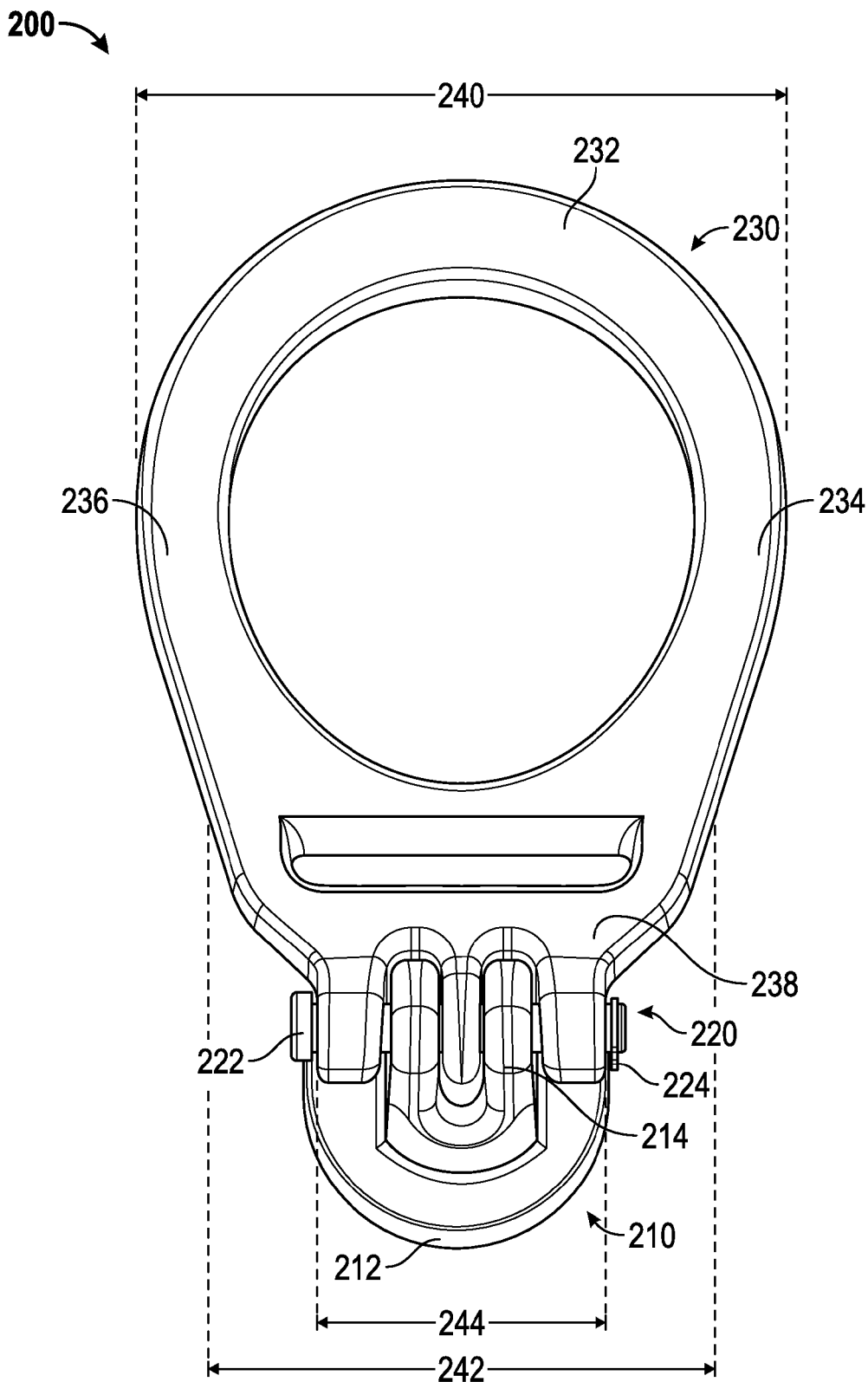
FIG. 10 is a top elevation view of a cargo tie down, according to an alternative embodiment.

Referring next to the exemplary embodiment shown in FIGS. 9-10, a cargo tie down, shown as tie down 200, provides a lightweight and low profile alternative to traditional tie downs. The tie down 200 includes a shackle, shown as upper member 230, coupled to a retainer, shown as lower member 210, with a hinge 220. The tie down 200 is configured to be coupled to a structure (e.g., a cargo body, a truck bed, a frame, etc.) and swivel about an axis defined by lower member 210. According to an exemplary embodiment, the hinge 220 allows the upper member 230 to rotate relative to the lower member 210.

As shown in FIGS. 9-10, the upper member 230 of the tie down 200 includes an arcuate portion, shown as curved portion 232, and a necking portion, shown as reducing portion 238, that provides a structure for coupling the upper member 230 to the lower member 210. As shown in FIG. 10, upper member 230 includes a first leg 234 and a second leg 236 extending between the curved portion 232 and the reducing portion 238.

According to an exemplary embodiment, the curved portion 232 merges into a distal end (e.g., relative to lower member 210) of the first leg 234 and a distal end (e.g., relative to lower member 210) of second leg 236. As shown in FIG. 10, curved portion 232, first leg 234, and second leg 236 form a generally D-shaped or arched contour. According to an exemplary embodiment, the curved portion 232, leg 234 and leg 236 have a rectangular cross-sectional shape with a thickness of less than 0.75 inches. According to an alternative embodiment, the curved portion 232, leg 236, and leg 236 have another cross-sectional shape (e.g., elliptical, round, etc.). According to an exemplary embodiment, the width of the curved portion 232, leg 234, and leg 236 is less than one inch to facilitate coupling a device (e.g., a hook) to the tie down 200. The edges of the curved portion 232, leg 234, and leg 236 are rounded to reduce wear that may otherwise occur to devices engaging the upper member 230. Rounded edges also reduce the risk of injury to an operator handling the upper member 230. According to an alternative embodiment, the edges are chamfered or otherwise shaped.

The distal end (e.g., relative to lower member 210) of leg 234 and the distal end (e.g., relative to lower member 210) of leg 236 are separated by a first width 240. According to an exemplary embodiment, leg 234 and leg 236 are angled relative to each other (e.g., inclined, tilted, not parallel, etc.) such that proximal end of leg 234 and the proximal end of leg 236 are separated by a second width 242 that is less than the first width 240. According to an exemplary embodiment, the angle between leg 234 and leg 236 is between 20 and 40 degrees. In some embodiments, the angle between leg 234 and leg 236 is about 35 degrees (e.g., within a range of 32-38 degrees). In other embodiments, the angle between leg 234 and leg 236 is about 28 degrees (e.g., within a range of 25-31 degrees). The difference between the first width 240 and the second width 242 and the resulting angle between leg 234 and leg 236 may be increased or decreased. By way of example, the second width 242 may be equal to the first width 240 such that the first leg 234 is parallel to the second leg 236.

The proximal end of the first leg 234 and the proximal end of the second leg 236 are coupled to the reducing portion 238. The reducing portion 238 extends between a first end (e.g., coupling end) and a second end (e.g., coupling end). The first end merges into the proximal end of first leg 234 and the proximal end of second leg 236. The first end has a width equal to the second width 242 and extends between leg 234 and leg 236. The width of the reducing portion 238 decreases from the second width 242 at the first end to a third width 244 at the second end.

Referring still to the exemplary embodiment shown in FIGS. 9-10, the lower member 210 of the tie down 200 includes a barrel that includes a distal end 214 (e.g., relative to a cargo body surface) configured to be coupled to the upper member and a proximal end 212 (e.g., relative to a cargo body surface) configured to engage a surface (e.g., a cargo body). As shown in FIG. 10, the barrel is a generally cylindrical member. According to an alternative embodiment, the barrel is a conical member (e.g., having draft angles to facilitate casting, etc.) or has still another shape. As shown in FIG. 10, the lower member 210 includes a flange projecting or extending outward radially from the proximal end of the barrel. The barrel may be received in an opening (e.g., an opening in a cargo bed) and subsequently coupled to the upper member 230. According to an exemplary embodiment, the diameter of the barrel is smaller than the diameter of the opening into which the lower member 210 is received, allowing the tie down 200 to rotate freely in the opening. According to an exemplary embodiment, the flange limits the travel of the tie down 200 along the first rotational axis through the contact between the structure around the opening and an upper surface (e.g., top surface, contact surface, interface surface) of the protrusion flange.

As shown in FIG. 10, the distal end of the barrel includes a pair of blades separated by a slot. The blades define aligned circular apertures, and the second rotational axis extends through the centers of the aligned circular apertures. The blades and the slot are sized such that the distal end of the barrel may interlock with corresponding bosses and slots of the upper member 230. According to the exemplary embodiment shown in FIG. 10, the hinge 220 is formed by a pin, shown as pivot shaft 222, inserted through apertures within the upper member 230 and the lower member 210. The pivot shaft 222 couples the upper member 230 to the lower member 210 such that upper member 230 may rotate relative to the lower member 210 about the pivot shaft 222 and the second rotational axis. The pivot shaft 222 is fixed along the second rotational axis by a head and a removable retaining member, shown as a snap ring 224. The pivot shaft 222 is sized to extend along the third width 244. By reducing the width of the reducing portion 238 between the second width 242 and the third width 244, the tie down 200 reduces the length of the pivot shaft 222 compared to a pin for a traditional, straight-sided D-ring. According to an exemplary embodiment, hinge 220 distributes the shear stresses applied on a pivot shaft 222 due to a load imparted on upper member 230, and pivot shaft 222 has a smaller diameter relative to traditional tie downs. As shown in FIG. 10, pivot shaft 222 is placed in triple shear. By distributing the sheer stress over a greater number of locations, the tie down 200 reduces the maximum shear stress experienced by any location of the pivot shaft 222. According to an exemplary embodiment, the pin diameter is larger and the shear stress may be applied at two points (e.g., the upper member 230 having two projections and the lower member 210 having a single arm). According to still other alternative embodiments, the shear stresses are applied at an even greater number of locations whereby the upper member 230 includes more than three projections and the lower member 210 includes more than two arms.

While the tie down has been generally described as being used on a military vehicle, it should be understood that the tie down may be used in other applications and in a wide variety of vehicles configured to carry a cargo, such as tow trucks, pickup trucks, flatbed trucks, fire trucks, utility trucks, rail cars, boats, and aircraft, among other vehicles.

The construction and arrangements of the tie down, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A cargo tie down, comprising:
   a retainer, comprising:
      a barrel having a proximal end and a distal end; and
      a flange extending radially outward from the proximal end of the barrel;
   a shackle, comprising:
      an arcuate portion merging into a distal end of a first leg and a distal end of a second leg, wherein a proximal end of the first leg and a proximal end of the second leg are separated by a first width; and
      a necking portion extending between a coupling end and an interface end, the coupling end spanning the first width and joining the proximal end of the first leg to the proximal end of the second leg, wherein a width of the necking portion decreases as it extends from the coupling end to the interface end; and
   a hinge including a pin extending through the interface end of the necking portion and the distal end of the barrel.

2. The cargo tie down of claim 1, wherein the shackle further comprises a plurality of projections extending from the interface end of the necking portion.

3. The cargo tie down of claim 2, wherein the retainer defines a channel within the distal end of the barrel.

4. The cargo tie down of claim 3, wherein the shackle includes three projections extending from the interface end of the necking portion and the channel forms a pair of blades extending from the distal end of the barrel, the three projections and the pair of blades forming an interlocking joint.

5. The cargo tie down of claim 1, wherein the first leg is angularly offset relative to the second leg.

6. The cargo tie down of claim 5, wherein the first leg and the second leg each extend between the distal end coupled to the arcuate portion and the proximal end coupled to the necking portion.

7. The cargo tie down of claim 6, wherein the distal end of the first leg and the distal end of the second leg are spaced a second width apart.

8. The cargo tie down of claim 7, wherein the second width is smaller than the first width.

9. The cargo tie down of claim 8, wherein the interface end of the necking portion defines a third width, wherein the third width is smaller than the second width.

10. The cargo tie down of claim 1, wherein the shackle includes a transverse leg that is offset from the coupling end of the necking portion, a void between the transverse leg and the coupling end forming a banding slot.

11. The cargo tie down of claim 1, wherein the flange defines an upper surface projecting from the barrel, the upper surface configured to interface with an underside of a cargo body frame member.

* * * * *